(12) United States Patent
Balakrishnaiah et al.

(10) Patent No.: US 8,745,088 B2
(45) Date of Patent: Jun. 3, 2014

(54) SYSTEM AND METHOD OF PERFORMING RISK ANALYSIS USING A PORTAL

(75) Inventors: Venkatesh B. Balakrishnaiah, Mountain View, CA (US); Senthil K. Chinnathambi, Fremont, CA (US); Ravikumar Subbarayan, Fremont, CA (US)

(73) Assignee: SAP AG, Walldorf, DE (US)

( * ) Notice: Subject to any disclaimer, the term of this patent is extended or adjusted under 35 U.S.C. 154(b) by 463 days.

(21) Appl. No.: 12/413,140

(22) Filed: Mar. 27, 2009

(65) Prior Publication Data

US 2010/0250603 A1    Sep. 30, 2010

(51) Int. Cl.
*G06F 17/30* (2006.01)

(52) U.S. Cl.
USPC .......................................... 707/783; 707/706

(58) Field of Classification Search
USPC .............................. 726/11, 22; 707/706, 783
See application file for complete search history.

(56) References Cited

U.S. PATENT DOCUMENTS

| | | | |
|---|---|---|---|
| 6,704,873 B1 * | 3/2004 | Underwood | .................... 726/12 |
| 7,240,067 B2 | 7/2007 | Timmons | |
| 7,346,923 B2 | 3/2008 | Atkins et al. | |
| 7,349,949 B1 | 3/2008 | Connor et al. | |
| 2002/0188458 A1 | 12/2002 | Babbrah | |
| 2004/0073445 A1 * | 4/2004 | Mellinger et al. | ................ 705/1 |
| 2005/0015439 A1 | 1/2005 | Balaji et al. | |
| 2007/0100834 A1 | 5/2007 | Landry et al. | |
| 2007/0150544 A1 * | 6/2007 | Jachner | .......................... 709/207 |
| 2007/0199060 A1 * | 8/2007 | Touboul | ........................... 726/11 |
| 2008/0034425 A1 * | 2/2008 | Overcash et al. | ................. 726/22 |
| 2008/0052137 A1 * | 2/2008 | Ziade et al. | .................... 705/4 |
| 2008/0091448 A1 | 4/2008 | Niheu et al. | |

FOREIGN PATENT DOCUMENTS

| | | | | |
|---|---|---|---|---|
| WO | WO 2004003706 A2 * | 4/2004 | ........................ | 17/60 |
| WO | WO 2007069245 A2 * | 8/2007 | ....................... | 726/11 |

* cited by examiner

*Primary Examiner* — Amresh Singh
(74) *Attorney, Agent, or Firm* — Fountainhead Law Group PC

(57) ABSTRACT

In one embodiment the present invention includes a system and method of performing risk analysis on a portal. In one embodiment, risk analysis software sends requests for user information and user authorization data to an agent. The agent may be coupled to a portal and may generate queries for accessing information on the portal. The portal may include user information and authorization data useful for performing risk analysis. The agent may retrieve information used in a risk analysis process and send the information to the risk analysis software.

21 Claims, 9 Drawing Sheets

SYSTEM AND METHOD OF PERFORMING RISK ANALYSIS USING A PORTAL

BACKGROUND

The present invention relates to computer implemented processes and systems including software for risk analysis, and in particular, to a system and method of performing risk analysis using a portal.

FIG. 1 illustrates a typical system of performing risk analysis based on data from enterprise systems. Enterprise systems may comprise of an ERP system 104, CRM system 106, a data warehouse 108, and a database 110. System 100 may include risk analysis software 102 that may perform detailed risk analysis on user authorization data from each data source in the enterprise system over a network 103. Software 102 may also include a plurality of predefined system connectors to enable secure connections to different data sources on an enterprise system. For example, software 102 may perform a risk analysis for user authorization data from ERP 104. Software 102 can access ERP 104 with a specific system connector for ERP 104 to retrieve data for analysis. In another example, software 102 may perform a risk analysis for user authorization data from CRM 106. Software 102 can access CRM 106 with a specific system connector for CRM 106 to retrieve data for analysis. In another example, software 102 may perform a risk analysis for user authorization data from data warehouse 108. Software 102 can access database 108 a specific system connector for data warehouse 108 to retrieve data for analysis. In another example, software 102 may also perform a risk analysis for user authorization data from database 110. Software 102 can access database 110 with a specific system connector for database 110 to retrieve data for analysis.

One problem with existing risk analysis systems is that different connections must be established for accessing information from each different system described above. Additionally, each system may store data in different format, which requires each separate connection to separately retrieve data in different native formats and separately interpret the data.

Thus, there is a need for an improved system and method of performing risk analysis. The present invention solves these and other problems by providing a system and method for performing risk analysis using a portal, such as an Enterprise portal, for example.

SUMMARY

Embodiments of the present invention improve the manner in which risk analysis is performed using a portal. In one embodiment, the present invention includes a computer-implemented method comprising receiving a plurality of requests from a risk analysis software component across a network in an agent software component, wherein the agent is coupled to an enterprise system portal software component, wherein said portal is coupled to a plurality of enterprise software systems and stores a plurality of user information and user authorization data for a plurality of users for specifying actions a user is authorized to perform in said enterprise software systems, the requests to said agent each including parameters corresponding to a risk analysis process executing on said risk analysis software, generating, by said agent, a plurality of queries in response to said plurality of requests, each query retrieving data based on parameters from a corresponding request, retrieving, by said portal, said user information stored in a user management component of said portal in response to a first query generated in response to a first request of said plurality of requests, and returning said user information to said agent in response to the first query, retrieving, by said portal, said user authorization data stored in a content directory component of said portal in response to a second query generated in response to a second request of said plurality of requests, and returning said user authorization data to said agent in response to the second query, and sending said user information and said user authorization data from said agent across said network to said risk analysis software for use in executing said risk analysis process.

In one embodiment, said portal is configured to receive real time updates of said plurality of user information and user authorization data from said plurality of enterprise software systems, and in accordance therewith, said agent sends real time user information and user authorization data to said risk analysis software for use in executing said risk analysis process.

In one embodiment, said request includes a security token, and wherein said queries are generated after said security token has been validated.

In one embodiment, the method further comprises receiving, in said agent, a credential for said risk analysis software in a first request of said plurality of requests, sending, from said agent to said portal, said credential, generating, by said portal, a security token if the credential is authorized by said portal, wherein said agent sends said queries to said portal with said security token, and wherein said portal performs said queries if said security token is validated, and wherein said portal does not performs said queries if said security token is not validated.

In one embodiment, said user information or said user authorization data is mapped by said agent from a first format used by said portal to a second format used by said risk analysis software.

In one embodiment, said agent comprises a plurality of different objects instantiated from a plurality of different classes for processing different data types.

In one embodiment, said mapped user information or user authorization data is merged from each object into a list by said agent before sending.

In one embodiment, first data retrieved by a first query based on a first parameter is stored in a first object, and second data retrieved by a second query based on a second parameter is stored in a second object, and wherein the first object maps the first data from a first format used by said portal to a second format used by said risk analysis software for said first data, and the second object maps the second data from a third format used by said portal to a fourth format used by said risk analysis software for said second data.

The following detailed description and accompanying drawings provide a better understanding of the nature and advantages of the present invention.

DETAILED DESCRIPTION

Described herein are techniques for performing risk analysis using a portal. In one embodiment, the present invention includes a computer implemented method of performing risk analysis using a portal, such as an Enterprise portal, for example. The method may be carried out on one or more computer systems and implemented as one or more software components or modules described below. One embodiment of the invention may include a computer readable medium, such as a hard disk, CD, DVD, or other volatile or non-volatile memory structures, for example, which embodies a computer program for performing a method of risk analysis using a portal. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
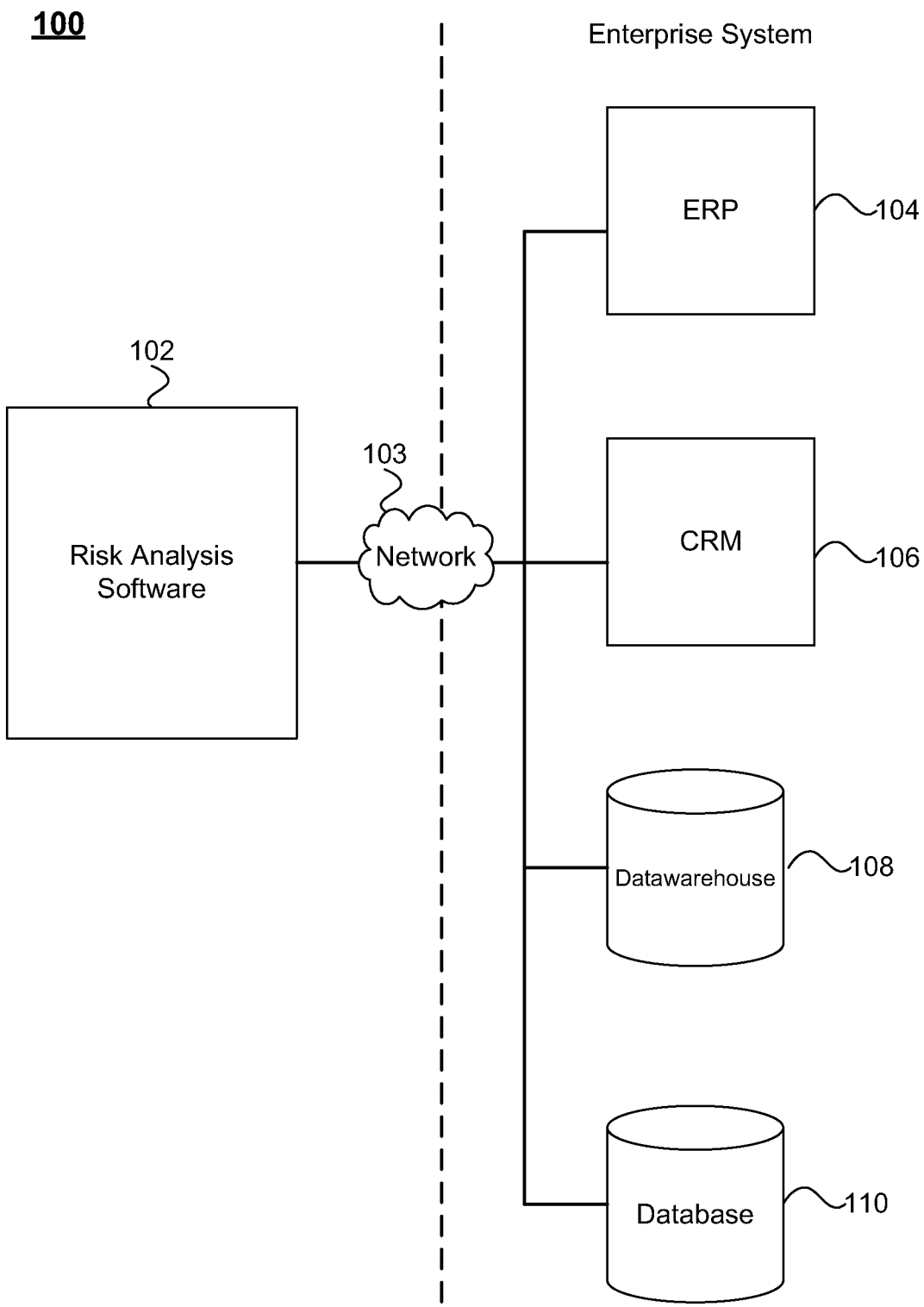
FIG. 1 illustrates existing risk analysis of an enterprise system.
Figure 2:
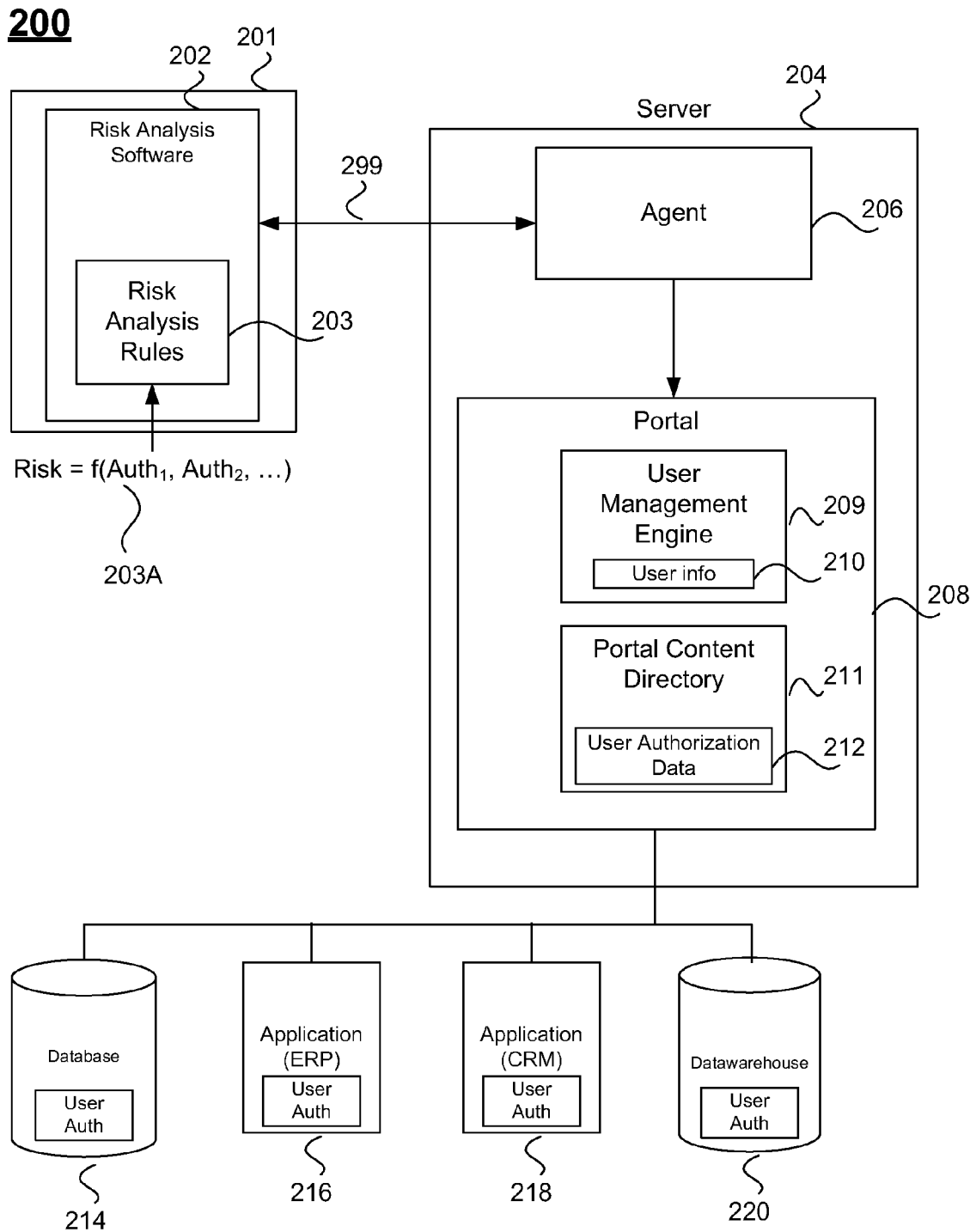
FIG. 2 illustrates an example system and method performing risk analysis using a portal according to one embodiment of the present invention.

FIG. 2 is an example system of performing risk analysis using an Enterprise portal according to one embodiment of the present invention. System 200 may be used to perform risk analysis over a network on user authorization data stored on one or more enterprise software systems. System 200 may include a risk analysis software component 202 running a computer system 201. Risk analysis software 202 may gather data about a user including the software systems the user has access to and the activities the user may perform on a particular software system (e.g., administrative permissions), for example, and the system may apply predefined risk analysis rules 203 against the user data to determine if the company or organization is exposed to a risk as a result of the user's software system usage and access. An example of a risk used to perform risk analysis is illustrated in 203A.

To retrieve the data to analyze, risk analysis software 202 may access an enterprise system portal software component 208 across a network 299. The portal 208 may be a service, such as a web service, running as a server application on server 204, for example. The portal 208 may allow users to access the Enterprise software system through a single point of contact, for example. Server 204 may include an agent software component 206 coupled to the portal 208. Agent 206 may be coupled between portal 208 and network 299 for performing transactions between risk analysis software 202 and portal 208. Agent 206 may receive one or more requests for data from risk analysis software 202 and generate specific queries based on the parameters of the request to retrieve the data. The queries may be made against a user management engine software component ("UME") 209 or a portal content directory software component ("PCD") 211, which may be coupled to or included as part of portal 208. For example, UME 209 may store user information 210. User information may include personal information for users such as name, user ID, company, and department that the user works in. If a request from risk analysis 202 for user information data is made, a query against UME 209 may be generated. Similarly, PCD 211 may store user authorization data 212 for performing particular actions in an Enterprise Software System. User authorization data may include user roles for access to one or more enterprise software systems. If a request from risk analysis software 202 for user authorization data is made, a query against PCD 211 may be generated. Once risk analysis software 202 receives user authorization data, the data may be applied to a risk 213A, for example. Portal 208 may also be coupled to a plurality of enterprise software systems. For example, enterprise software systems may include a database 214, ERP system 216, CRM system 218, and a data warehouse 220. Each enterprise software system stores a plurality of user information and user authorization data.

UME 209 is populated with user information 210, and PCD 211 is populated with user authorization data 212 retrieved from one or more enterprise software systems. In the present example, user information 210 and user authorization data 212 are retrieved from database 214, ERP system 216, CRM system 218, and/or data warehouse 220 and stored in UME 209 and PCD 211. As a part of the portal setup process, user authorization data from each enterprise software system may be loaded into PCD 211. The data in PCD 211 may be constantly updated. For example, if new user authorization data has been created in a table on ERP 216, a predefined trigger may be executed in response to the update. The trigger may send a notification of the new data to PCD 211 and automatically update user authorization data 212 with the new data. This process may repeat as long as user authorization data on the enterprise software systems has changed. Portal 208 may be configured to receive real time updates of user information and user authorization data from the enterprise software systems. Accordingly, real time information may be sent by the agent 206 to risk analysis software 202 for use in a risk analysis process. One of the advantages of the present invention is that it provides a central access point to user information 210 and user authorization data 212 from various applications and data sources in the enterprise system.

Figure 3:
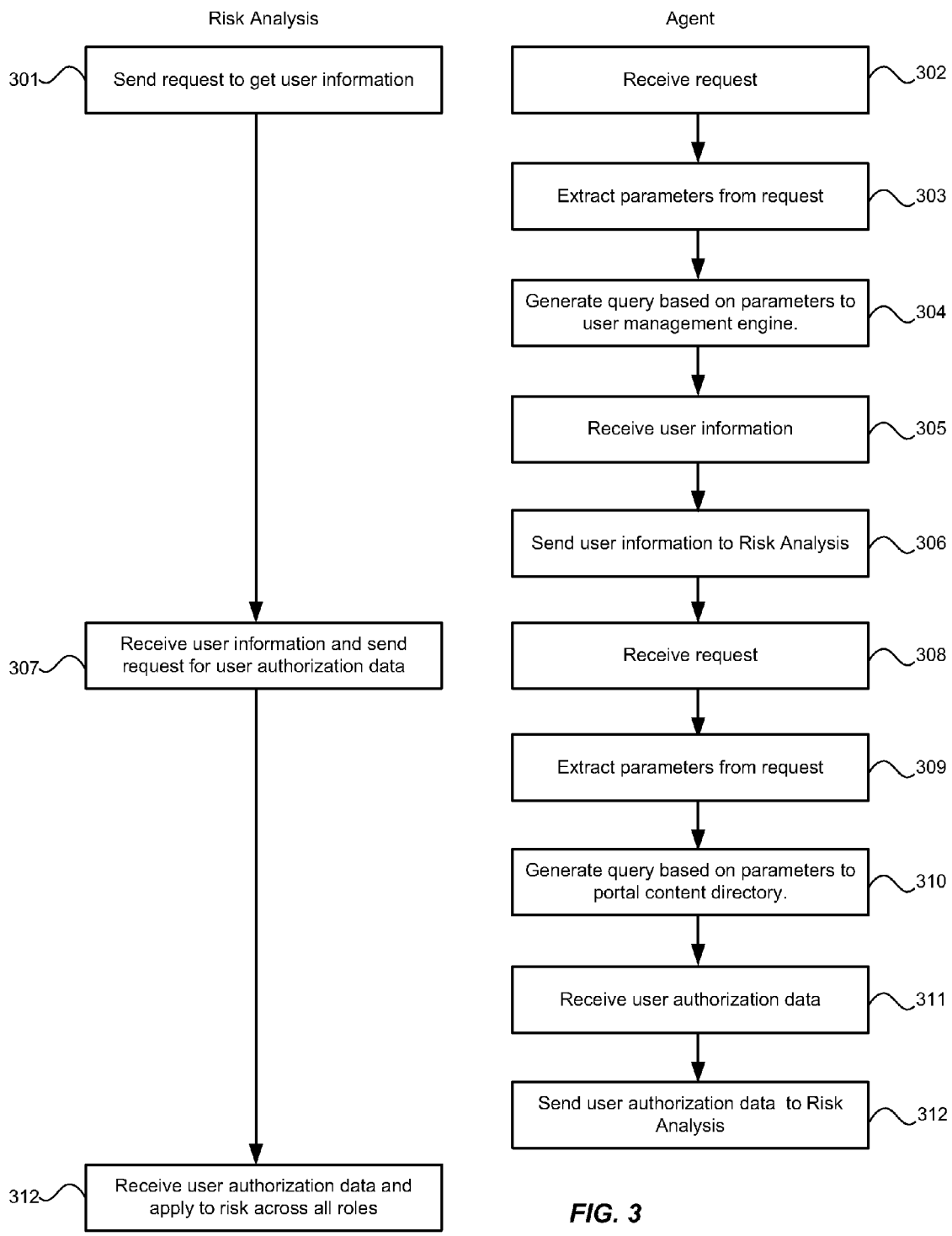
FIG. 3 illustrates an example of performing risk analysis using a portal according to one embodiment of the present invention.

FIG. 3 illustrates an example of performing risk analysis using a portal according to one embodiment of the present invention. The present example illustrates the interaction between risk analysis software and an agent service during a risk analysis process. At 301, a request from risk analysis software to retrieve user information for analysis is sent to the agent service. At 302, agent receives the request. The request may include different parameters. For example, one or more parameters of a first request may specify user information to be retrieved. In particular, the parameters may specify all users, a range of users, particular users, or specific time periods. For example, risk analysis software may send a request to retrieve user information for all users created in a system between 01/01/2008 and 01/01/2009, for example. The agent may extract the parameters from the request at 303 to generate a query to retrieve the requested data at 304. For instance, at 304 the agent generates a query and sends the query to the UME on the portal, which stores the user information as described above. At 305, the user information is received by the agent. The user information may include account information for users of the enterprise system including first and last name, role in the company (e.g., job title and/or department or division or both), employee number or code, and contact information (e.g., address, telephone, and email), for example. The query describe above may be generated from a parameter in the request, which in turn may derived from a risk analysis process. For example, if a risk analysis process includes determining risk for all employees in Europe, the parameter received in the request may specify "EU" (e.g., a country code in the user information), and the query may include "EU", which will return user information for all users working in Europe. The request may further specify the specific fields of each user information record to be returned. For example, the request may include parameters specifying "first name" and "last name" fields of the user information are to be retrieved. Accordingly, the query may also further specify, for each user record, which information to return so that the agent only retrieves the data required by the risk analysis process. For example, a query may specify to return the "first name" and "last name" fields of each user information record having a country code of "EU". For example, the request may include parameters specifying the names in range [A-D]. Accordingly, the query may also further specify, for each user record, which authorization information to return so that the agent only retrieves the data required by the risk analysis process.

Once user information is returned to the agent at 305, the agent will send it across a network to the risk analysis software at 306. At 307, risk analysis software receives the user information. Accordingly, a second request is sent to retrieve the user authorization data, which may specify particular users based on the results of the first request. At 308, the agent receives the second request. The request may also include different parameters. For example, the parameters of the second request may specify user authorization data. For example, the parameters may include roles, actions (iViews), or permissions assigned to all users, a range of users, or particular users. The agent may extract the parameters from the request at 309 to generate a second query to retrieve the requested data. At 310, the agent sends a second query to the PCD on the portal, which stores the user authorization data as described above. Once the requested user authorization data is returned to the agent at 311, the agent will send it across a network to the risk analysis software at 312. At 313, the risk analysis software receives the data and uses it in executing the risk analysis process. For example, it may apply the authorization data to one or more predefined risk analysis rules and generate risk analysis results.

Figure 4:
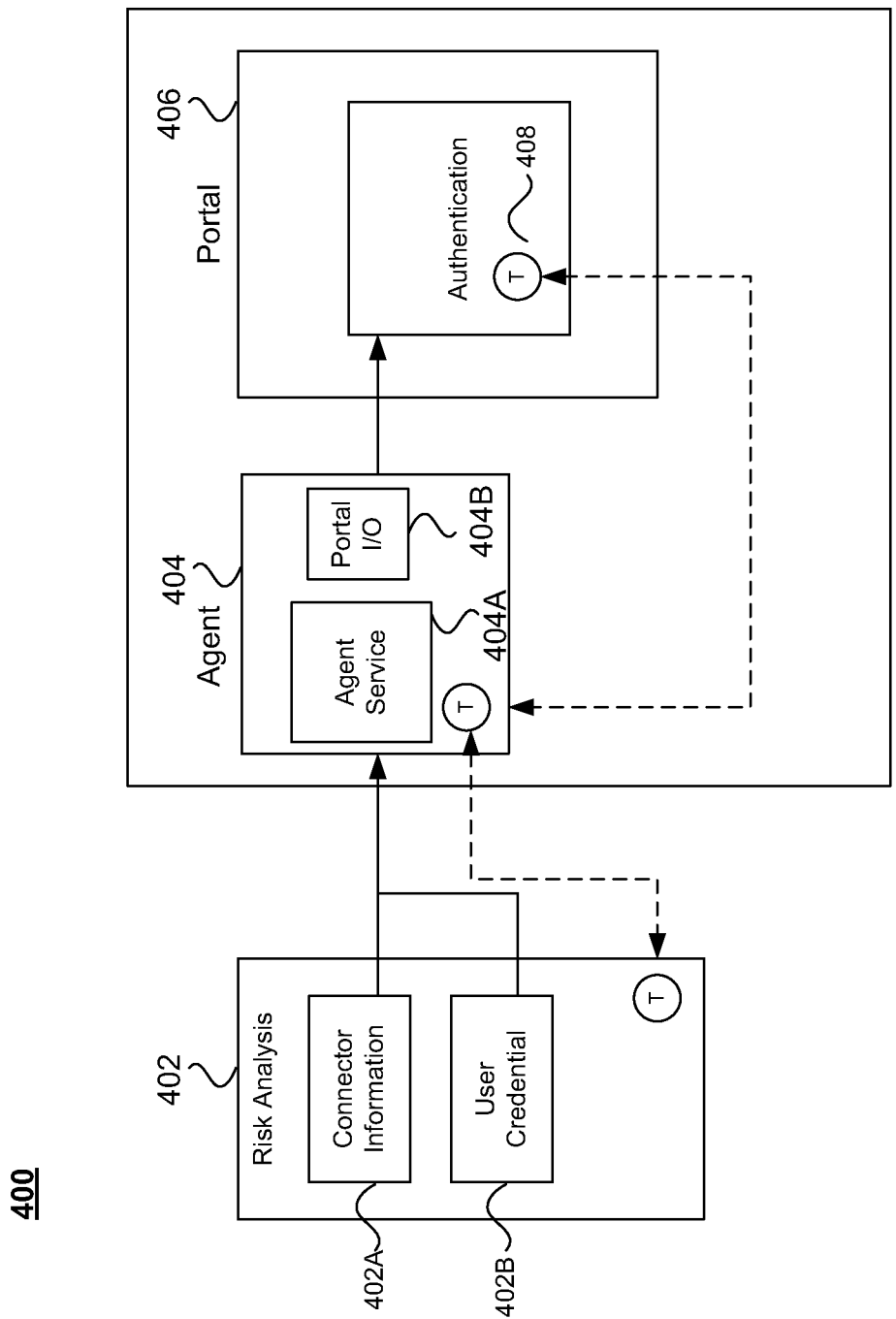
FIG. 4 illustrates an example system of user authentication for performing risk analysis using a portal according to one embodiment of the present invention.

FIG. 4 illustrates an example system of user authentication for performing risk analysis using a portal according to one embodiment of the present invention. System 400 may include a risk analysis software 402 and agent 404 coupled to portal 406. Agent 404 may also include an agent service 404A and I/O component 404B. Before a risk analysis process begins, a secure communication link between risk analysis software 402 and agent 404 may be established. Agent service 404A interacts with risk analysis software 402 and portal 406 to request and retrieve user information and user authorization data. I/O component 404B may be used to generate data in a format supported by risk analysis software 402, as will be described in FIGS. 6-7. Risk analysis software 402 may include connector information 402A and user credential 402B. Connector information may be web services connectors that enable secure data exchanges across a network. Connector information may be a URL link to the agent 404, for example. User credential 402B may include a user ID and password. Risk analysis software 402 may send a request for user information or user authorization data with connector information 402A and credential 402B to agent 404. The first request may be either for user information, role information, or user authorization data in the portal content directory. Accordingly, the first request may be "Request to login to get token+Fetch for role/user/authorization data". First, a user may login, get the token, and use it for performing the first request as well following requests in that session. Agent 404 may log into portal 406 using the credential. Connection information including a credential may include a Connector Type as "Web Services", URL="WSDL file location of the web services of portal service", user id=" id of a user having certain admin rights to fetch any user, role or authorization data of a particular user", password, Server name="where the Enterprise portal is installed, the server IP address", and port number. A connection screen may be presented to a user of the Risk Analysis software to enter the following information for establishing a connection to the portal through the agent: System=PORTAL; System Name=Portal; System Type=Portal; Connection Type=Web Service; URL=http://<address>; User ID=<ID>; Password=<password>; Server Name=<server address>; Port Number=<port number>.

Portal 406 may authenticate the credential and generate a security token 408. Token 408 is sent to and received by agent 404. Token 408 is sent to portal 406 for validation. Once token 408 is validated, the request for user information or user authorization data may proceed, and agent 404 may generate the queries to send to portal 406. Portal 406 returns the information to agent 404. Agent 404 returns the requested user information and token 408 to risk analysis software 402 to be used for subsequent requests. Once a user has been authenticated, risk analysis software 402 may send one or more requests for user information or user authorization data with token 408. If token 408 is not validated, portal 406 may not perform the query generated by agent 404. Token 408 may only be valid for a single login session to portal 406. Once risk analysis software 402 logs out of portal 406, token 408 may no longer be valid. A new request with connector information and user credential information, as described above, may be made after a session has ended, for example.

Figure 5:
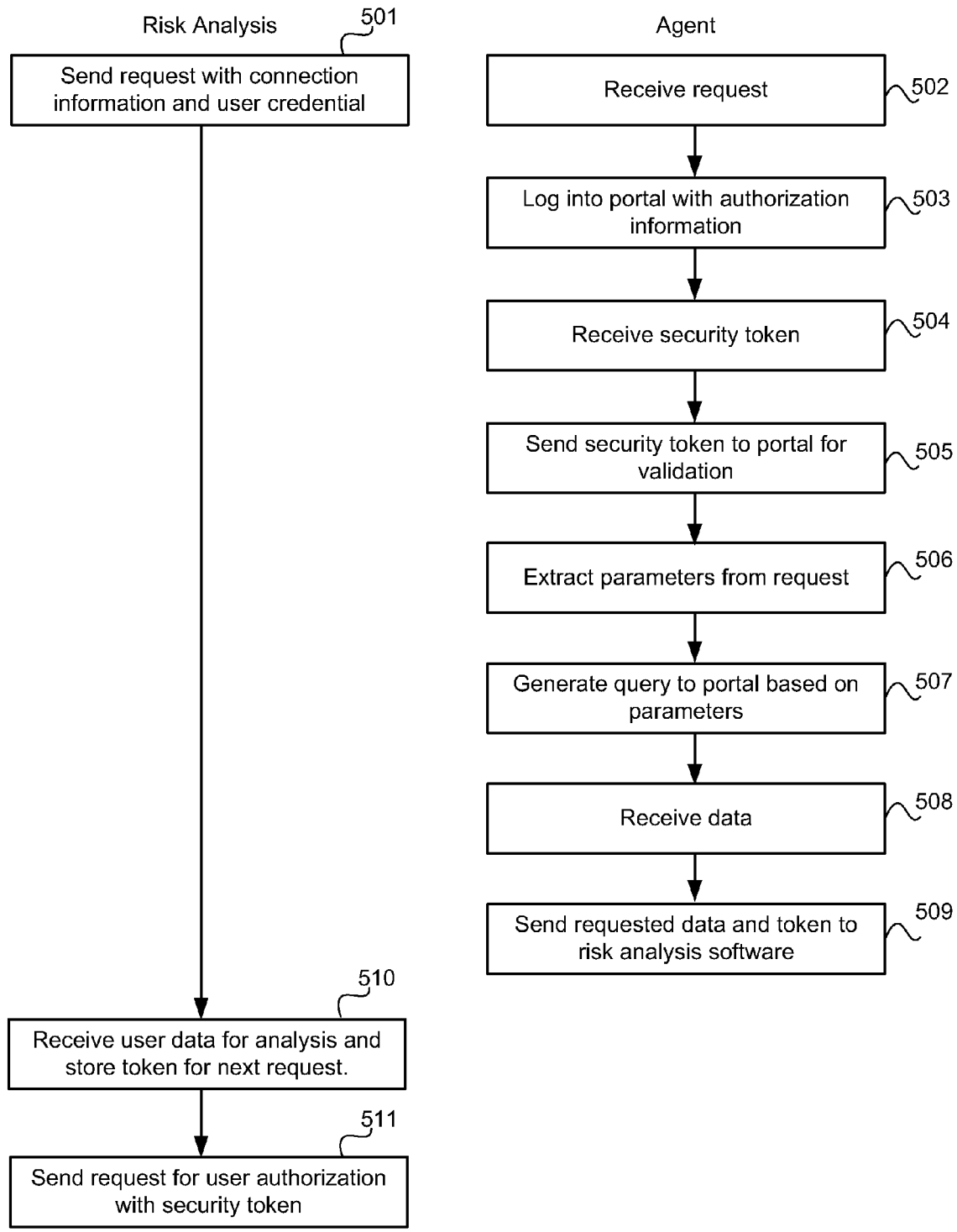
FIG. 5 illustrates a method of user authentication for performing risk analysis using a portal according to one embodiment of the present invention.

FIG. 5 illustrates a method of user authentication for performing risk analysis using a portal according to one embodiment of the present invention. The present example illustrates the interaction between a risk analysis software and an agent service during an authentication process for a risk analysis process. At 501, risk analysis software sends a request to the agent. The request may include connector information and user credential data. User credential data may be as simple as a user ID and a password. At 502, the agent receives the request. The agent logs into a portal with the user credential at 503. If the portal validates the user credential, it will generate a security token and return the security token to the agent at 504. At 505, the agent sends the security token back to the portal to validate the current request. If the security token is not validated, then the portal may not perform the queries generated by the agent. If the security token is validated, the portal may perform the queries generated by the agent. As illustrated, the agent extracts the parameters from the request at 506, generates the necessary queries, and sends the queries to the portal at 507. The portal may run the queries that were received from the agent and return the results at 508. The agent returns the requested data to the risk analysis software with the security token at 509. At 510, the risk analysis software receives the data and stores the security token for subsequent requests. If the risk analysis software makes additional requests for user information or user authorization data, the request is sent with the security token at 511. Steps 505 through 509 may be repeated for subsequent requests. The security token may be valid for one or more requests that are made within one login session. For example, if a risk analysis user logs out of the application, the security token may no longer be valid. In order for risk analysis software to retrieve user data to analyze, the request with connector information and user credential information may need to be sent to the agent again.

Figure 6A:
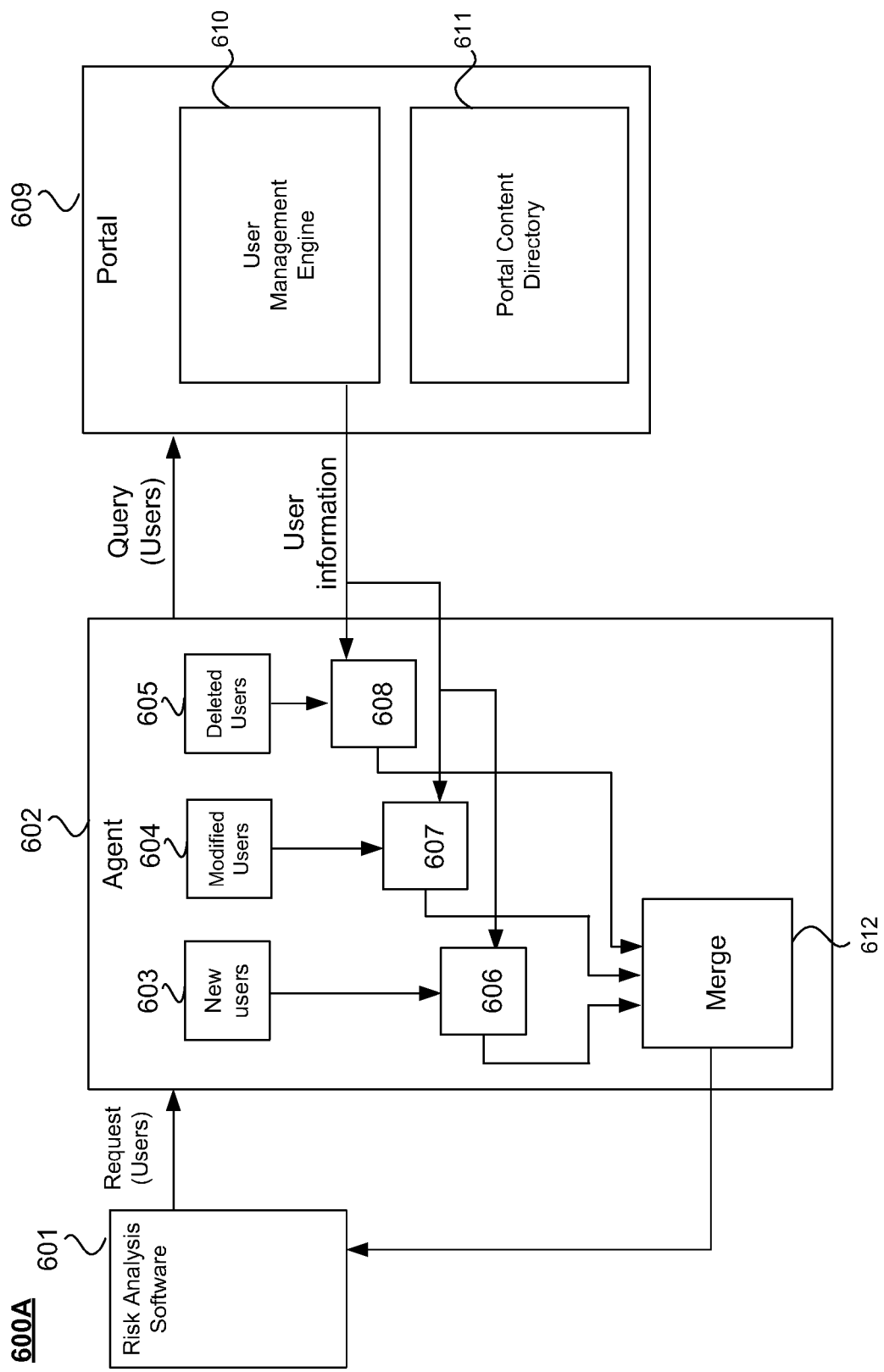
FIG. 6A illustrates an example of mapping data from a portal to risk analysis software according to one embodiment of the present invention.

FIG. 6A illustrates an example of mapping data from a portal to risk analysis software according to one embodiment of the present invention. Various types of data from various enterprise software systems may be stored in different formats on a portal. Risk analysis software 601 may only accept data in one standard format. Therefore, the data retrieved from a portal may need to be converted into a format that is required by the risk analysis software. Embodiments of the present invention advantageously provide a single point of throughput for retrieving and reformatting data for use in a risk analysis process. System 600A may include risk analysis software 601 sending a request for user information to an agent 602 and receiving data in a required format. Agent 602 may include different classes for mapping different data from a portal format to a format used by risk analysis software 601. For instance, classes may include a new users class 603, modified users class 604, and deleted users classes 605. Each class may correspond to a specific type of data, as illustrated in the present example. Each of these classes may be used to collect different types of user data and map the data from one format into a second format used by risk analysis software 601. Each class may also have a corresponding object 606-608, which is an instantiation of the class. Each object may store the data to be formatted and perform the transformation. Agent 602 generates the necessary queries to retrieve the requested user information to portal 609. Portal 609 may include a user management engine 610, which may store user information, and a portal content directory 611, which may store user authorization data. The present request is for user information. Therefore the portal 609 performs one or more queries on user management engine 610. The requested user information is returned to agent 602. Agent 602 receives the user information. The user information is separated according to data types (e.g., different record fields) and converted using corresponding objects 606-608 into a format required by risk analysis software 601. The user information from each object may be merged into a single list using a merge component 612. The merged list is then returned to risk analysis 601 for a risk analysis process.

Figure 6B:
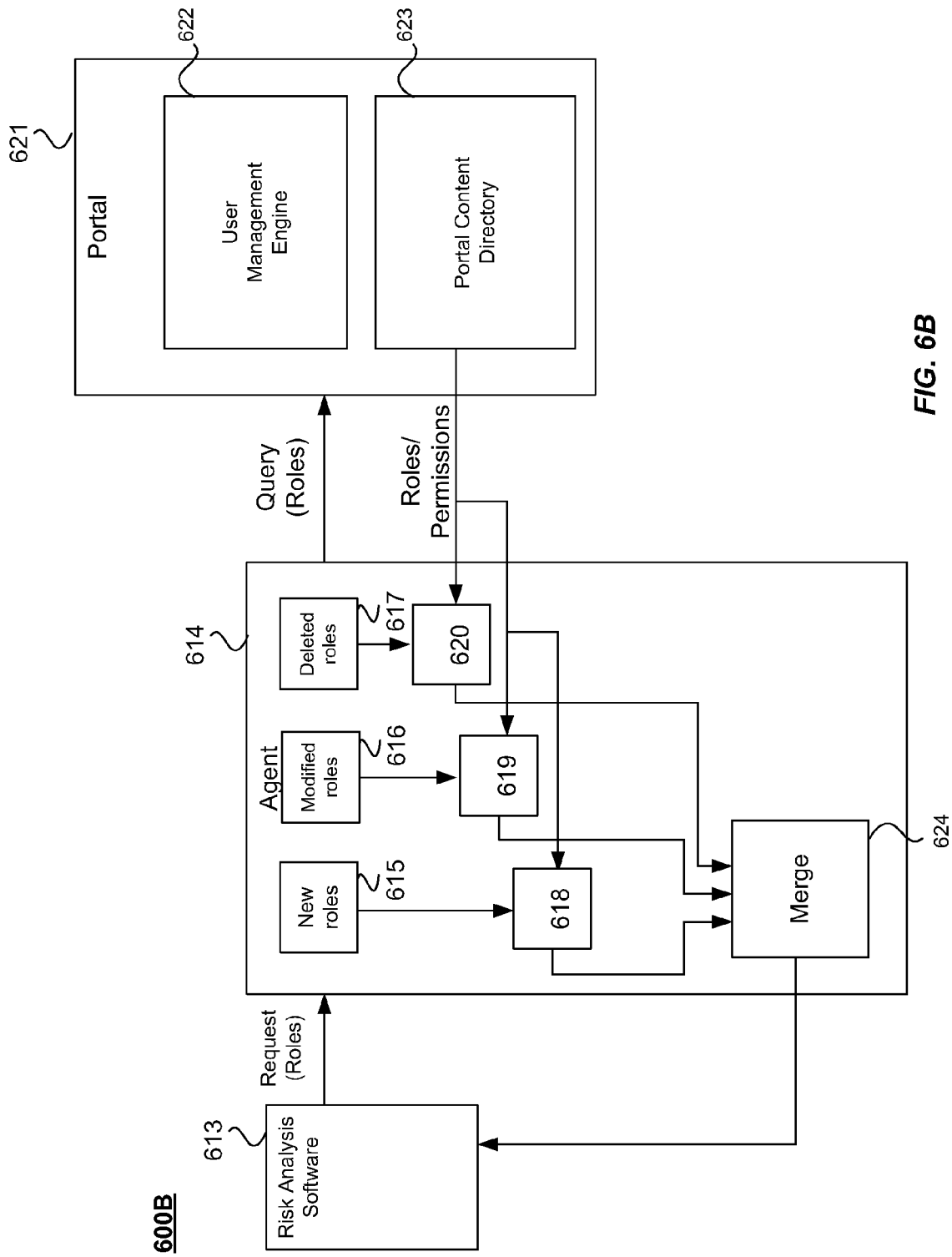
FIG. 6B illustrates another example of mapping data from a portal to risk analysis software according to one embodiment of the present invention.

FIG. 6B illustrates another example of mapping data from a portal to risk analysis software according to one embodiment of the present invention. System 600B may include risk analysis software 613 sending a request for user roles to the agent 614. In some applications, user authorization is role based, where a user is assigned one or more roles in a company and the roles are associated with permissions so that a user with a particular role will have corresponding permissions that authorize the user to perform specified activities in the enterprise software system. Agent 614 may include different classes for mapping different data from a portal format to a format used by risk analysis software 613. For instance, classes may include a new roles class 615, modified roles class 616, and deleted roles classes 617. Each class may correspond to a specific type of data, as illustrated in the present example. Each of these classes may be used to collect different types of user roles and map the data from one format into a second format used by risk analysis software 613. Each class may also have a corresponding object 618-620 which may stores and process the data to be formatted. Agent 614 generates the necessary queries to retrieve the requested user information to portal 621. Portal 621 may include a portal content directory 623, which may store user authorization data. User authorization data may include user roles or permissions or both. The present request is for user roles information, therefore portal 621 performs one or more queries on portal content directory 623. The requested authorization data is returned to agent 614. Agent 614 receives the authorization data. The authorization data is separated according to data type and converted by corresponding objects 618-620 into a format required by risk analysis software 613. The reformatted data may then be stored in corresponding objects 618-620. The authorization data from each object may be merged into a single list using a merge process 624. The merged list is then returned to risk analysis 613 for a risk analysis process.

Figure 7:
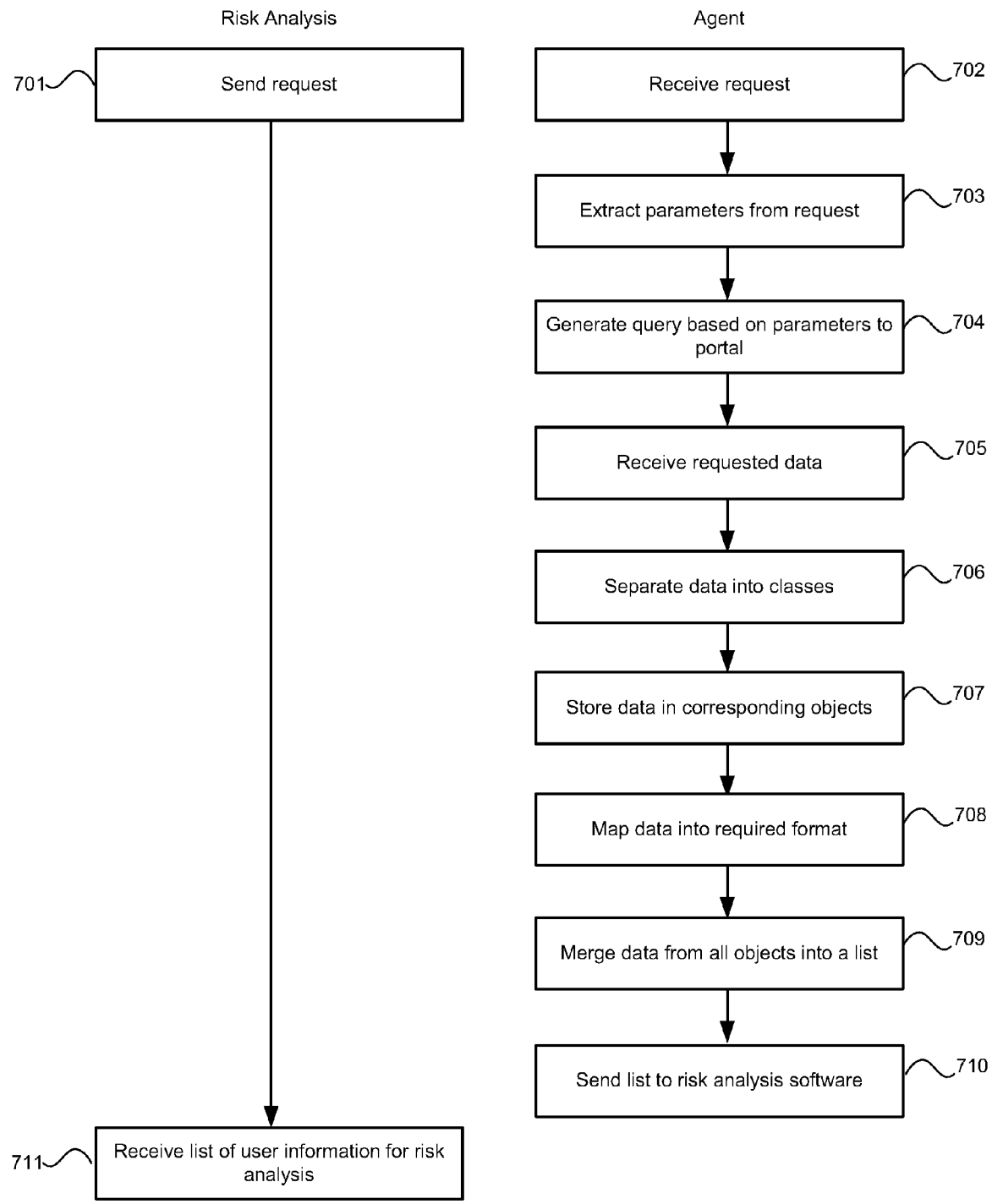
FIG. 7 illustrates a method of mapping data from a portal to risk analysis software according to one embodiment of the present invention.

FIG. 7 illustrates a method of mapping data from a portal to a risk analysis software according to one embodiment of the present invention. The present example illustrates the interaction between a risk analysis software and an agent service during a data conversion process. At 701, a risk analysis software sends a request for user data analyze. The request may be for user information or user authorization data, for example. The agent receives the request at 702. Agent extracts the parameters from the request at 703. The parameters may be user information or user authorization data. Based on the parameters, agent may generate one or more queries to retrieve the requested data from a portal at 704. If the parameter is user information, then the portal may perform the queries on a user management engine. If the parameter is user authorization data, then the portal may perform the queries on a portal content directory. At 705, portal returns the results to the agent. Each type of data may belong to a specific class. If the requested data is for user information, there may be a deleted users class, new users class, modified users class, or existing users class, for example. There may be many more classes. The agent may separate the data received from the portal into different classes at 706. Each class may also have a corresponding object in which the separated data may be stored at 707. The object may map the data from a format used by the portal into another format used by the risk analysis software at 708. These steps repeat for all data stored in the objects. Once all data have been mapped into a format used by risk analysis software, the data may be merged into a single list at 709 and returned to risk analysis software at 710. At 711, risk analysis software receives the list of user data to analyze.

Figure 8:
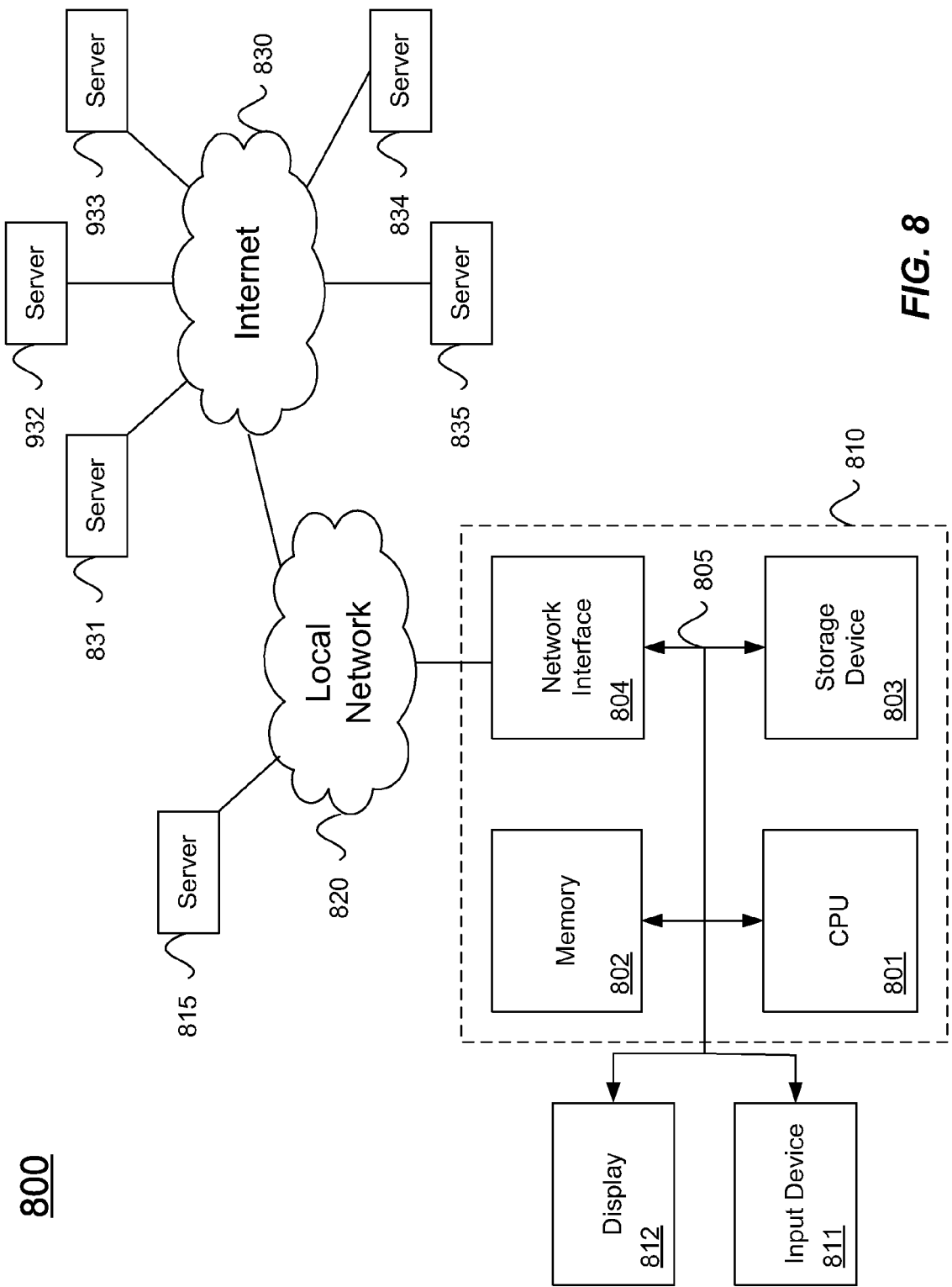
FIG. 8 illustrates a hardware system for implementing processes according to one embodiment of the present invention.

FIG. 8 illustrates a simplified diagram of a hardware system for implementing processes according to one embodiment of the present invention. Computer system 810 includes one or more buses 805 or other communication mechanism for communicating information, and one or more central processing units ("CPUs" or "processors") 801 coupled with bus 805 for processing information. The central processing unit may be configured to perform the functions described above and is the means for performing the functions described above. Computer system 810 also includes one or more memories 802 coupled to bus 805 for storing information and instructions to be executed by processors 801, including information and instructions for performing the techniques described above, for example. This memory may also be used for storing variables or other intermediate information during execution of instructions to be executed by processors 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques or embodying the constructs above, for example.

Computer system 810 may be coupled via bus 805 to an output device such as a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 804 sends and receives electrical, electromagnetic, or optical signals that carry digital data streams representing various types of information.

Computer system 810 can send and receive information, including messages or other interface actions, through the network interface 804 to an Intranet or the Internet 830. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. Different processes may be implemented on any computer system and send and/or receive information across a network, for example. In one embodiment, the techniques describe above may be implemented by software services on one or more servers 810, 815, and 831-835, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a plurality of requests from a risk analysis software component across a network in an agent software component, wherein the agent is coupled to an enterprise system portal software component, wherein said portal is coupled to a plurality of enterprise software systems and stores a plurality of user information and user authorization data for a plurality of users for specifying actions a user is authorized to perform in said enterprise software systems, the requests to said agent each including parameters corresponding to a risk analysis process executing on said risk analysis software, wherein a risk results according to a function that combines two or more of the actions the user is authorized to perform;
generating, by said agent, a plurality of queries in response to said plurality of requests, each query retrieving data based on parameters from a corresponding request;
retrieving, by said portal, said user information stored in a user management component of said portal in response to a first query generated in response to a first request of said plurality of requests, and returning said user information to said agent in response to the first query;
retrieving, by said portal, said user authorization data stored in a content directory component of said portal in response to a second query generated in response to a second request of said plurality of requests, and returning said user authorization data to said agent in response to the second query;
sending said user information and said user authorization data from said agent across said network to said risk analysis software; and
executing said risk analysis process using said user information and said user authorization data to determine the risk resulting from said user information and said user authorization data,
wherein said user information or said user authorization data is mapped by said agent from a first format used by said portal to a second format used by said risk analysis software,
wherein said agent comprises a plurality of different objects instantiated from a plurality of different classes for processing different data types,
wherein said plurality of classes includes a new roles class corresponding to new roles of the plurality of users, a modified roles class corresponding to modified roles of the plurality of users, a deleted roles class corresponding to deleted roles of the plurality of users, and an users class corresponding to the plurality of users, and
wherein said portal is configured to receive real time updates of said plurality of user information and said user authorization data from said plurality of enterprise software systems, and in accordance therewith, said agent sends real time user information and real time user authorization data to said risk analysis software for use in executing said risk analysis process.

2. The method of claim 1 wherein said request includes a security token, and wherein said queries are generated after said security token has been validated.

3. The method of claim 1 further comprising
receiving, in said agent, a credential for said risk analysis software in a first request of said plurality of requests;
sending, from said agent to said portal, said credential;
generating, by said portal, a security token if the credential is authorized by said portal,
wherein said agent sends said queries to said portal with said security token, and wherein said portal performs said queries if said security token is validated, and wherein said portal does not performs said queries if said security token is not validated.

4. The method of claim 1 wherein said mapped user information or user authorization data is merged from each object into a list by said agent before sending.

5. The method of claim 1 wherein first data retrieved by a first query based on a first parameter is stored in a first object, and second data retrieved by a second query based on a second parameter is stored in a second object, and wherein the first object maps the first data from a first format used by said portal to a second format used by said risk analysis software for said first data, and the second object maps the second data from a third format used by said portal to a fourth format used by said risk analysis software for said second data.

6. The method of claim 1, wherein said first format and said second format each require a separate connection to separately retrieve data in different native formats and separately interpret the data.

7. The method of claim 1, wherein said plurality of objects includes a new roles object that is instantiated from the new roles class, a modified roles object that is instantiated from the modified roles class, a deleted roles object that is instantiated from the deleted roles class, and an existing roles object that is instantiated from the existing roles class.

8. A non-transitory storage medium embodying a computer program for performing a method, said method comprising:

receiving a plurality of requests from a risk analysis software component across a network in an agent software component, wherein the agent is coupled to an enterprise system portal software component, wherein said portal is coupled to a plurality of enterprise software systems and stores a plurality of user information and user authorization data for a plurality of users for specifying actions a user is authorized to perform in said enterprise software systems, the requests to said agent each including parameters corresponding to a risk analysis process executing on said risk analysis software, wherein a risk results according to a function that combines two or more of the actions the user is authorized to perform;

generating, by said agent, a plurality of queries in response to said plurality of requests, each query retrieving data based on parameters from a corresponding request;

retrieving, by said portal, said user information stored in a user management component of said portal in response to a first query generated in response to a first request of said plurality of requests, and returning said user information to said agent in response to the first query;

retrieving, by said portal, said user authorization data stored in a content directory component of said portal in response to a second query generated in response to a second request of said plurality of requests, and returning said user authorization data to said agent in response to the second query;

sending said user information and said user authorization data from said agent across said network to said risk analysis software; and executing said risk analysis process using said user information and said user authorization data to determine the risk resulting from said user information and said user authorization data, wherein said user information or said user authorization data is mapped by said agent from a first format used by said portal to a second format used by said risk analysis software, wherein said agent comprises a plurality of different objects instantiated from a plurality of different classes for processing different data types, wherein said plurality of classes includes a new roles class corresponding to new roles of the plurality of users, a modified roles class corresponding to modified roles of the plurality of users, a deleted roles class corresponding to deleted roles of the plurality of users, and an users class corresponding to the plurality of users, and wherein said portal is configured to receive real time updates of said plurality of user information and said user authorization data from said plurality of enterprise software systems, and in accordance therewith, said agent sends real time user information and real time user authorization data to said risk analysis software for use in executing said risk analysis process.

9. The non-transitory storage medium of claim 8 wherein said request includes a security token, and wherein said queries are generated after said security token has been validated.

10. The non-transitory storage medium of claim 8 further comprising receiving, in said agent, a credential for said risk analysis software in a first request of said plurality of requests;

sending, from said agent to said portal, said credential;

generating, by said portal, a security token if the credential is authorized by said portal, wherein said agent sends said queries to said portal with said security token, and wherein said portal performs said queries if said security token is validated, and wherein said portal does not performs said queries if said security token is not validated.

11. The non-transitory storage medium of claim 8 wherein said mapped user information or user authorization data is merged from each object into a list by said agent before sending.

12. The non-transitory storage medium of claim 8 wherein first data retrieved by a first query based on a first parameter is stored in a first object, and second data retrieved by a second query based on a second parameter is stored in a second object, and wherein the first object maps the first data from a first format used by said portal to a second format used by said risk analysis software for said first data, and the second object maps the second data from a third format used by said portal to a fourth format used by said risk analysis software for said second data.

13. The non-transitory storage medium of claim 8, wherein said first format and said second format each require a separate connection to separately retrieve data in different native formats and separately interpret the data.

14. The non-transitory storage medium of claim 8, wherein said first format and said second format each require a separate connection to separately retrieve data in different native formats and separately interpret the data.

15. A computer system comprising:

one or more processors;

a network interface for coupling the computer system to a network;

a risk analysis software component;

an enterprise system portal software component coupled to one or more enterprise software systems, wherein said portal stores a plurality of user information and user authorization data for a plurality of users for specifying actions each user is authorized to perform in said enterprise software systems; and an agent software component coupled to said portal, said agent receiving a plurality of requests from said risk analysis software component across the network, wherein the requests to said agent each include parameters corresponding to a risk analysis process executing on said risk analysis software, wherein a risk results according to a function that combines two or more of the actions the user is authorized to perform, wherein said agent generates a plurality of queries in response to said plurality of requests, each query retrieving data based on parameters from a corresponding request, wherein said portal retrieves said user information stored in a user management component of said portal in response to a first query generated in response to a first request of said plurality of requests, and returns said user information to said agent in response to the first query, wherein said portal retrieves said user authorization data stored in a content directory component of said portal in response to a second query generated in response to a second request of said plurality of requests, and returns said user authorization data to said agent in response to the second query, wherein said agent sends said user information and said user authorization data across said network to said risk analysis software for use in executing said risk analysis software, and wherein said risk analysis software component executes said risk analysis process using said user information and said user authorization data to determine the risk resulting from said user information and said user authorization data, wherein said user information or said user authorization data is mapped by said agent from a first format used by said portal to a second format used by said risk analysis software, wherein said agent comprises a plurality of different objects instantiated from a plurality of different classes for processing different data types, wherein said plurality of classes includes a new roles class corresponding to new roles of the plurality of users, a modified roles class corresponding to modified roles of the plurality of users, a deleted roles class corresponding to deleted roles of the plurality of users, and an users class corresponding to the plurality of users, and wherein said portal is configured to receive real time updates of said plurality of user information and said user authorization data from said plurality of enterprise software systems, and in accordance therewith, said agent sends real time user information and real time user authorization data to said risk analysis software for use in executing said risk analysis process.

16. The computer system of claim 15 wherein said agent receives a credential for said risk analysis software in a first request of said plurality of requests, said agent sends said credential to said portal, said portal generates a security token if the credential is authorized by said portal, wherein said agent sends said queries to said portal with said security token, and wherein said portal performs said queries if said security token is validated, and wherein said portal does not performs said queries if said security token is not validated.

17. The computer system of claim 15, wherein said request includes a security token, and wherein said queries are generated after said security token has been validated.

18. The computer system of claim 15, wherein said mapped user information or user authorization data is merged from each object into a list by said agent before sending.

19. The computer system of claim 15, wherein first data retrieved by a first query based on a first parameter is stored in a first object, and second data retrieved by a second query based on a second parameter is stored in a second object, and wherein the first object maps the first data from a first format used by said portal to a second format used by said risk analysis software for said first data, and the second object maps the second data from a third format used by said portal to a fourth format used by said risk analysis software for said second data.

20. The computer system of claim 15, wherein said first format and said second format each require a separate connection to separately retrieve data in different native formats and separately interpret the data.

21. The computer system of claim 15, wherein said first format and said second format each require a separate connection to separately retrieve data in different native formats and separately interpret the data.

* * * * *